United States Patent [19]
Giani

[11] Patent Number: 5,836,681
[45] Date of Patent: Nov. 17, 1998

[54] MACHINE WITH TWO CONVERGING THREADED ROTORS FOR THE EXTRUSION OF PLASTOMERS ELASTOMERS AND THE LIKE

[75] Inventor: Mauro Matteo Giani, Guanzate, Italy

[73] Assignee: Pomini S.P.A., Castellanza, Italy

[21] Appl. No.: 741,381

[22] Filed: Oct. 29, 1996

[30] Foreign Application Priority Data

Nov. 21, 1995 [IT] Italy .................................. MI95A2415

[51] Int. Cl.$^6$ .............................. B29B 7/22; B01F 7/08
[52] U.S. Cl. ....................... 366/83; 366/100; 074/655 H; 425/204
[58] Field of Search ................................. 366/83, 89, 97, 366/292, 298, 301, 318, 100; 425/204, 208, 209; 74/655 H, 655 F, 655 G, 655 GA, 655 GB

[56] References Cited

U.S. PATENT DOCUMENTS

| | | | |
|---|---|---|---|
| 2,466,934 | 4/1949 | Dellenbarger | 74/665 H |
| 4,527,899 | 7/1985 | Blach et al. | 366/79 |
| 4,688,447 | 8/1987 | Dick | 74/655 F |
| 4,764,020 | 8/1988 | Moriyama | 366/300 |
| 4,773,763 | 9/1988 | Weber | 366/83 |
| 5,232,280 | 8/1993 | Moriyama | 366/83 |
| 5,415,473 | 5/1995 | Nakano et al. | 525/204 |

FOREIGN PATENT DOCUMENTS

| | | | |
|---|---|---|---|
| 0 598 376 A | 5/1994 | European Pat. Off. . | |
| 2748918 | 5/1979 | Germany | 425/204 |
| 37 00 771 C | 5/1988 | Germany . | |
| 36425 | 3/1983 | Japan | 425/204 |
| 156030 | 8/1985 | Japan | 425/204 |
| 444470 | 3/1968 | Switzerland | 425/204 |

OTHER PUBLICATIONS

Patent Abstracts of Japan, vol. 009, No. 282 (M–428, 9 Nov. 1985 and JP 60 124231 A (Masao Moriyama), 3 Jul. 1985.
Patent Abstracts of Japan, vol. 007, No. 116 (M–216, 20 May 1983, & JP 58 036425 A (Yokohama Gomu KK), 3 Mar. 1983.

*Primary Examiner*—Tony G. Soohoo
*Attorney, Agent, or Firm*—Herbert Dubno; Yuri Kateshov

[57] ABSTRACT

Machine with two generally converging threaded rotors (5) for the extrusion of plastomers, elastomers and the like, comprising a structure (1, 2, 3) supporting a housing (4) containing the rotors (5), a casing (6) containing a pair of reducers (7), a device (11) for generating the movement and devices (10) for synchronized transmission thereof to the two reducers (7), wherein said housing containing the rotors (5) and said casing (6) containing the reducers are rigidly fixed to the support structure (1, 2, 3) and integrally connected together via a housing (8) arranged between the two and containing first means (8a, 8c) for supporting the rotors (5), said rotors being formed in two separate parts (5a, 5b), removably joined to one another, said devices (10) for synchronized transmission of the movement being integral with the bottom part of the said casing (6) and having a high-speed shaft (12) arranged along an axis forming an angle with the axis of the associated rotor (5) and coaxial with the high-speed shaft of the other synchronized transmission device, said high-speed drive shafts (12) being coupled to the first shaft (14) of the respective reducer (7) via a bevel gear (13).

9 Claims, 3 Drawing Sheets

MACHINE WITH TWO CONVERGING THREADED ROTORS FOR THE EXTRUSION OF PLASTOMERS ELASTOMERS AND THE LIKE

SPECIFICATION

1. Field of the Invention

Description

The present invention relates to a machine with converging and threaded rotors for the extrusion of plastomers, elastomers and the like.

2. Background of the Invention

In the technical sector of elastomer and plastomer processing it is known to use a twin-screw extruder machine in which two threaded shafts or are arranged with converging axes inside a containment casing.

It is also known that such rotors said rotors must be made to rotate at a low number of revolutions and in a synchronized manner with respect to one another so as to maintain the angular phase difference. The latter is predefined during assembly of the machine so as to avoid interference between the threads of the two rotors which otherwise would prevent rotation particularly in the case of rotors of the interpenetrating type.

It is also known from the publications EP 0,472,431 and EP 0,598,376 of devices for actuating the rotors based on either transmissions of the endless-screw type, helical wheel and bevel gears for direct transmission of the movement and the synchronism between the low-speed rotors, or in the first case; and transmissions with a reducer associated with each rotor and conical drives for transmission of the movement and the synchronism via the high-speed shafts rather than the low-speed shafts, in the second case.

The extruders according to the known art, however have a support and containment structure of large dimensions and considerable structural complexity which substantially prevents easy assembly during installation and subsequent easy access for the routine maintenance operations.

In addition to this, the extruder of the type illustrated in the patent EP 0,598,376 designed such that the reducers are mounted projecting from the rotor shaft, which is thus exposed to undesirable flexural stresses not due to interaction with the material.

OBJECTS OF THE INVENTION

It is, therefore, a principle object to provide an extruder of the type with two converging screws, or conical twin-screw extruder, which allows transmission of the movement and the synchronism to the rotors. Still another object is to provide a simple structure by simple and readily available means which is able to ensure the necessary resistance to the flexural and torsional forces.

Yet a further object is to provide the extruder with a support structure that is extremely rigid and compact and easily accessible.

SUMMARY OF THE INVENTION

These results are obtained by the present invention which provides a machine with converging threaded rotors for the extrusion of plastomers, elastomers and the like, comprising a structure supporting a housing containing the rotors. A casing contains a pair of reducers, a device for generating the movement and devices for synchronized transmission thereof to the two reducers. The housing containing the rotors and the casing containing the reducers are rigidly fixed to the support structure and integrally connected together by rather a housing arranged between the two. The other housing contains first means for supporting the rotors, which are formed in two separate parts removably joined to one another. One of the parts is for receiving the driving movement and the other has a variable-pitch threading. The devices for synchronized transmission of the movement are integral with the bottom part of the the casing.

Each of the high-speed shafts is arranged along an axis forming an angle with the axis of the associated rotor and coaxial with the high-speed shaft of the other synchronized transmission device, the high-speed drive shafts are coupled to the first shaft of the respective reducer via a bevel gear.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
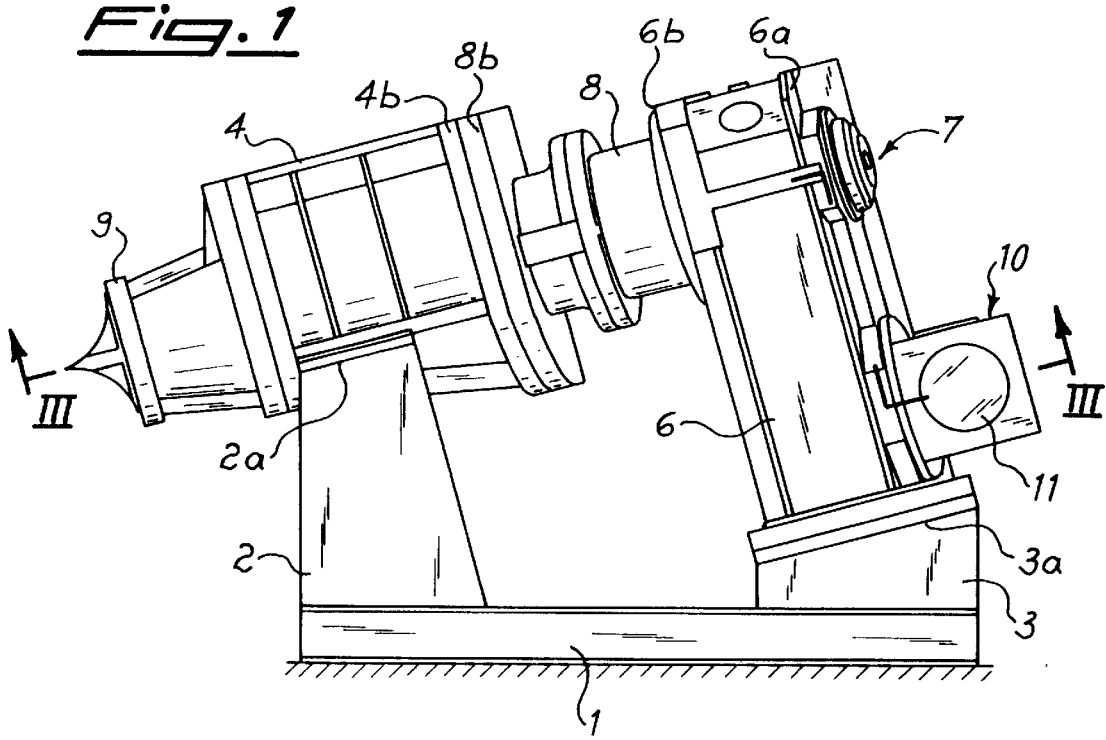
FIG. 1 is a side view of the extruder according to the invention.
Figure 2:
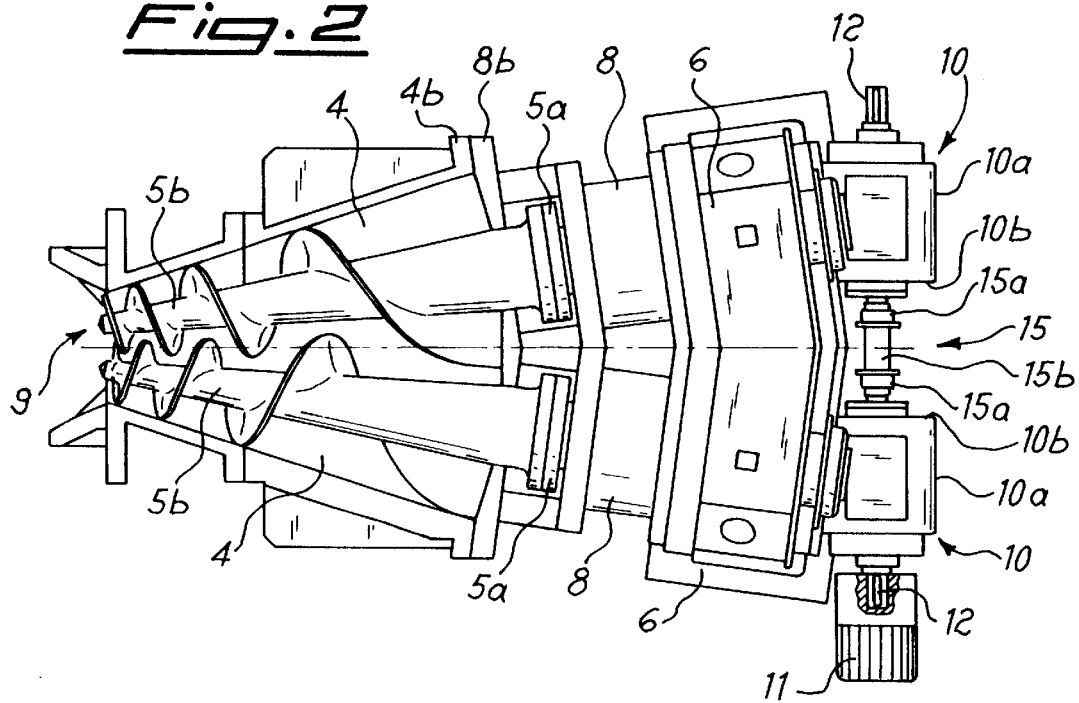
FIG. 2 is a plan view of the extruder partially open in the region of the rotors.
Figure 3:
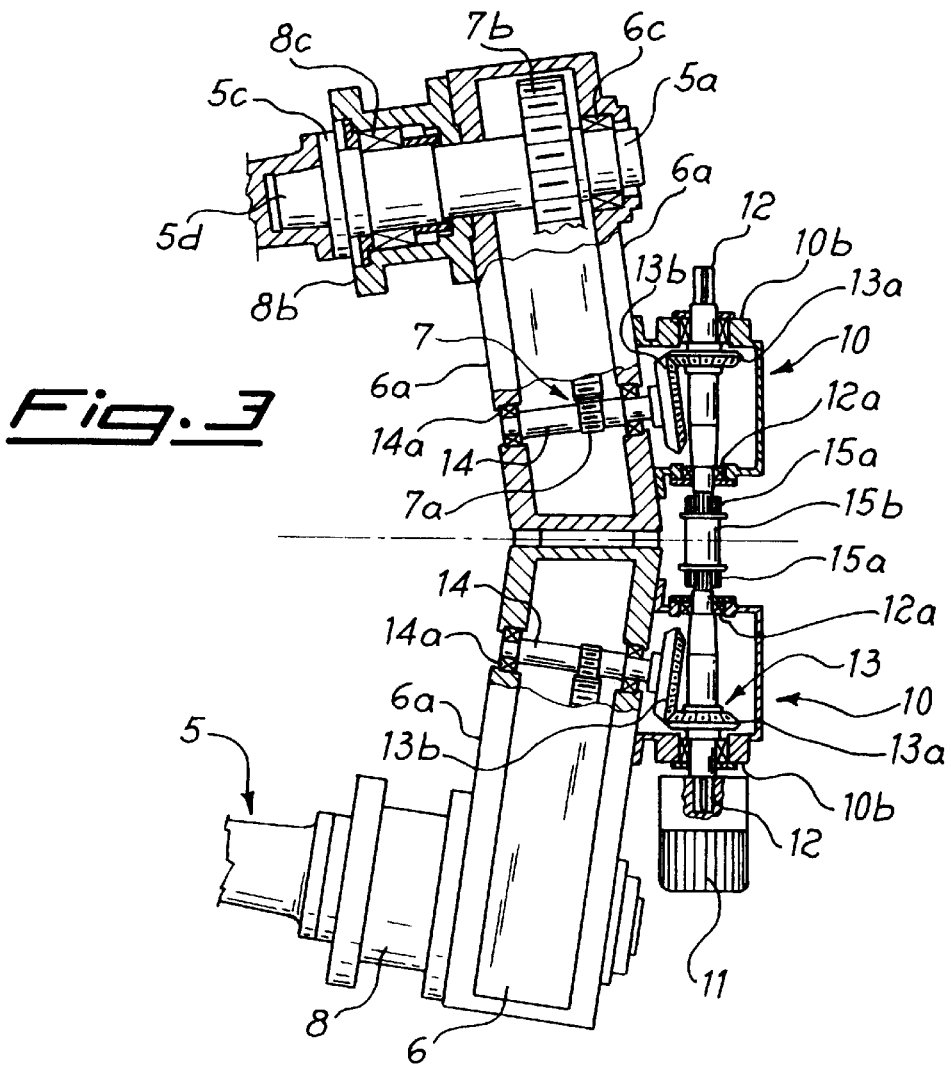
FIG. 3 is a partial section along a plane indicated by III—III in FIG. 1.

As shown in FIG. 1, the extruder according to the invention comprises a base 1 having arranged on it uprights 2 and 3, the respective upper surfaces 2a and 3a of which are parallel with one another and inclined towards the front part of the machine by a suitable angle.

The front uprights 2 support the housing 4 containing the rotors 5, while the rear uprights 3 support a casing 6 containing a reducer associated with each rotor 5.

The top part of the rear wall 6a of the casing 6 has housed inside it first radial bearings 6c for supporting the rotors 5, while the front wall 6b of the casing 6 is to mesh integrally with two housings 8 containing second radial bearings 8c supporting the rotors 5 and thrust bearings 8a.

The housing 8 is rigidly connected to a flange 8b divided into two halves along a directrix parallel to the longitudinal axis of the machine and designed for front coupling with a corresponding flange 4b of said housing 4.

Having halves of the flanges 8b, 4b allows easy opening of the housings 4, 8, respectively.

The bottom part of the casing 6 has integrally formed here with devices 10 for receiving the driving movement from the motor 11 and for synchronized transmission thereof to the two reducers 7.

The entire arrangement of the parts described above which form the extruder is realized so as to give rise to an angle of convergency of the axes of the two rotors 5 and a downwards inclination of the entire mixing and extruding part of the machine, corresponding to the front part of the machine itself so as to facilitate feeding of the material towards the extrusion head 9, avoiding stagnation of the material to be extruded.

More particularly, each device 10 for synchronized transmission of the movement consists of a housing 10a on the opposite faces 10b of which there are arranged the bearings 12a for supporting a shaft 12 carrying a conical toothed wheel 13a of a bevel gear 13, the other conical wheel 13b of which is mounted on a shaft 14 which rotates on bearings 14a fixed to the opposite front walls 6a of the casing 6.

The shafts 14 are arranged with their axes parallel to the axes of the associated rotor 5. As a result, the same is between the axes of the two rotors 5 as well as between the shafts 14.

This means that, since the shafts 12 of the transmission and synchronization devices 10 have to be kept coaxial, the bevel gears 13a, 13b must be meshed at a corresponding angle which allows recovery of the angle existing between the axes of the rotors.

According to an embodiment of the extruder according to the invention, this angle is between 10° and 20° and preferably between 14° and 18°.

In addition because of the reduction resulting from the bevel gear pair 13, the shaft 14 parallel to the axis of the rotor 5 has a lower speed than the high-speed shaft 12 which is driven directly by the motor 11.

The shaft 14 has mounted on it a first cylindrical gear 7a of the reducer 7, the last gear 7b of which is keyed onto the shaft 5a of the associated rotor 5.

The two coaxial shafts 12 of the devices 10 for transmission and synchronization of the movement are connected together via a central coupling 15 which is formed by two bell members 15a which are internally toothed and designed to be inserted onto a toothed hub 12a mounted on each shaft 12 and by a central tubular section 15b flanged at its opposite ends for locking, via screw means 17 to corresponding flanges of the bell members 15a.

This coupling therefore allows the possibility of fine adjustment of the phase difference between the two shafts 12 since it is sufficient to unscrew the tubular element 15b, extracting it from its coaxial position, remove one of the two bell members 15a, rotate the hub 12a even by only one tooth, and restore the connection by means of the coupling, so as to obtain in a rapid and safe manner a precise phase difference between the two rotors 5.

Figure 4:
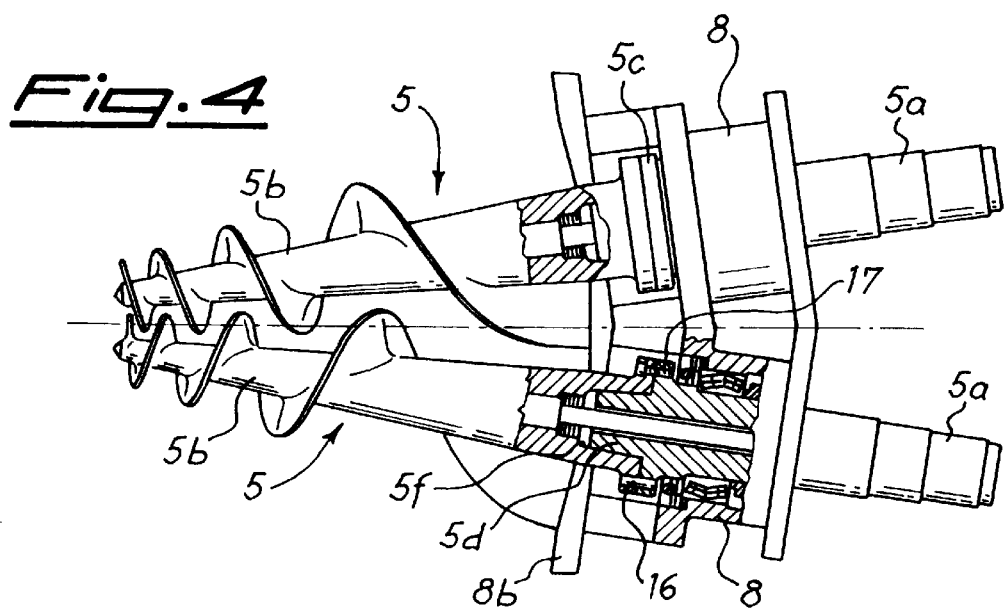
FIG. 4 is a partial plan view—partially sectioned—of the rotors according to the invention.
Figure 5:
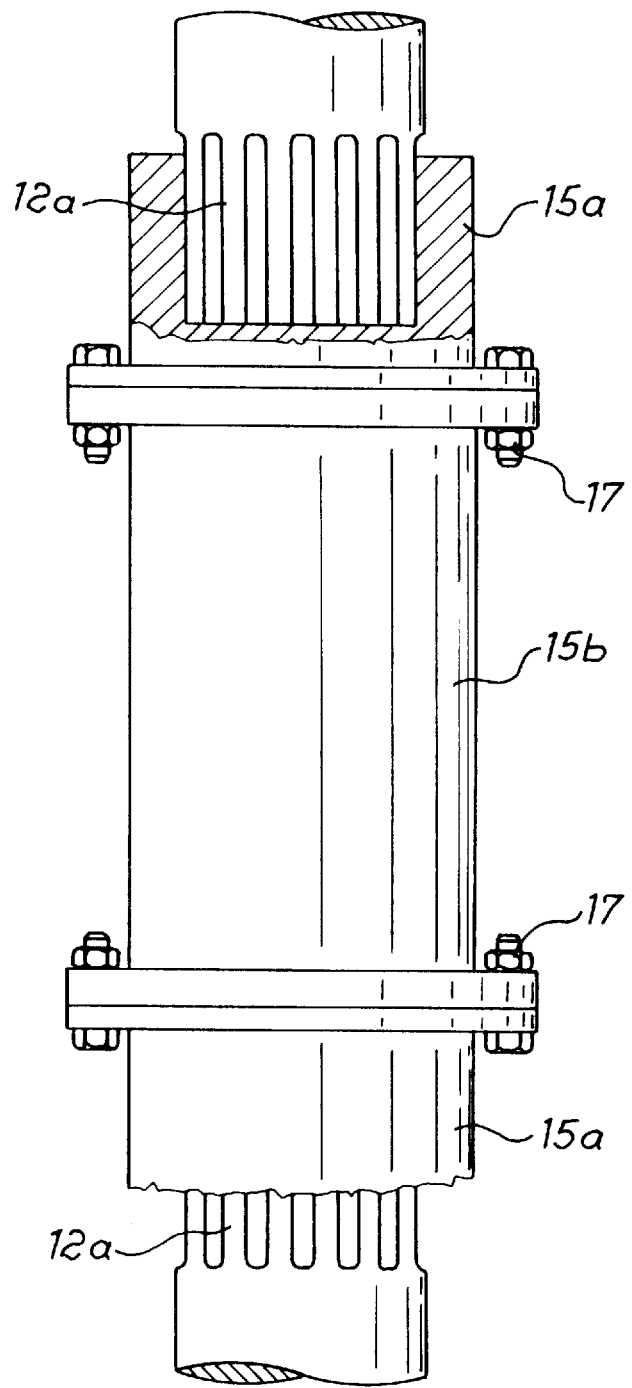
FIG. 5 is a detailed view of the driving means partially broken away.

According to a preferred embodiment and as illustrated more clearly in FIG. 4, the rotors 5 are formed in two separate parts consisting of the drive shaft 5a and the threaded part 5b. The shaft 5a is supported at the rear by the associated radial bearings 8c, 6c and by the thrust bearing 8a, respectively housed in the casing 6 and in the housing 8 arranged between and integral with the casing 6 itself and the housing 4 containing the rotors 5.

The rotor shaft has a front flange 5c with, emerging from it, a conical journal 5d for coupling with a corresponding conical seat 5f formed in the threaded part 5b of the rotor 5, so that insertion of the latter onto the shaft is performed with a self-centering action and with friction which contributes to transmission of the movement.

The angular positioning and locking of the threaded part 5b to the shaft 5a is performed by means of pins 16 and screws 17 arranged between respective front-abutting flanges of the two parts 5a, 5b of the rotor 5 to be joined.

From the configuration described above it is therefore obvious how the twin-screw extruder has features of extreme compactness and structural rigidity resulting, among other things, from the fact that the movement reducer group is mounted on the support structure integral with the base, the radial flexural loads generated on the screw during mixing thus being compensated for.

A further characteristic feature of the extruder according to the invention consists in the fact the devices for transmission and synchronization of the movement are in turn integral with the fixed structure of the extruder, thus enabling the high-speed shafts of the transmission to be kept coaxial without the substantial need for elements for recovery of the angular play, such as universal joints and the like.

In addition to this, an obvious advantage is the possibility of replacing only the threaded part of the rotor without having to extract the drive shaft—extraction which would require the disassembly of a much larger number of heavy and delicate parts of the movement transmission devices, allowing moreover zero-load testing of the transmission members to be performed.

Many variations may be introduced as regards the realization of the parts which make up the invention, without thereby departing from the protective scope of the present invention as defined by the claims which follow.

I claim:

1. A double screw extruder, comprising:

a support;

a housing mounted on the support;

a pair of rotors extending along respective rotor axes and housed in said housing, the rotor axes converging toward each other, each of the rotors having:
   respective front shaft and rotor shaft removably attached to each other, the rotor shaft protruding beyond and terminating outside the housing,
   respective centering means for aligning the respective shafts along the respective rotor axis, and
   respective angular means for angularly positioning the respective shafts upon aligning, and
   respective locking means for locking the front and rotor shafts upon angularly positioning the shafts;

a casing mounted on said support and receiving said rotor shafts and connected with said housing;

drive means on the casing for actuating said rotors and having a drive axis transverse to the rotor axes, said drive means including a pair of high-speed, spaced apart and coaxial driving shafts rotatable about the drive axis and each operatively connected with the respective rotor; and synchronizing means formed on a bottom of the casing for synchronizing rotation of said rotors and including:
   coupling means for adjusting the phase difference between said driving shafts, and
   a pair of reducers connecting each of the high-speed driving shafts with the respective rotor and comprising:
      a respective reducer shaft extending along a shaft axis parallel to the respective rotor axis,
      respective bevel gear means for coupling each of the high-speed shafts with the respective one of the reducer shafts, a respective pair of reducer and high-speed driving shafts forming therebetween a respective angle differing from 90°, and
      respective cylindrical gear means each mounted rotatably fixedly on the respective reducer shaft and operatively connected with the respective rotor shaft.

2. The screw extruder defined in claim 1 wherein said casing is formed as one piece.

3. The screw extruder defined in claim 1 wherein said casing is formed with a pair of halves fixed together along a vertical plane of symmetry of the extruder.

4. The screw extruder defined in claim 1 wherein each front shaft has a variable-pitch threading.

5. The screw extruder defined in claim 1 wherein each of said rotor shafts is rotatably supported by a respective radial bearing provided in the casing and by a respective thrust bearing mounted in the housing.

6. The screw extruder defined in claim 1 wherein each of the bevel gear means has a respective conical coupling surface with a half angle corresponding to said angle between the driving and reducer shafts.

7. The screw extruder defined in claim 1 wherein said reducer shafts rotate at a speed lower than the high-speed shafts.

8. The screw extruder defined in claim 1 wherein the coupling means horizontally connecting said high-speed shafts.

9. The screw extruder defined in claim 8 wherein said coupling means including:
- a pair of bell members spaced along the drive axis, each of said bell members being formed with an respective internal array of teeth,
- a pair of toothed hubs spaced apart along said drive axis, each of the hubs being mounted on the respective high-speed shaft and meshing with the respective bell member,
- a central tubular section formed with a pair of flanges mounted on said tubular part on opposite ends thereof and coupled with said bell members, and
- screw means for locking said flanges of the tubular section with said bell members.

* * * * *